May 26, 1925.                           1,539,128
R. LOEB
MEANS FOR CUTTING FABRICS
Filed Jan. 28, 1921          6 Sheets-Sheet 6
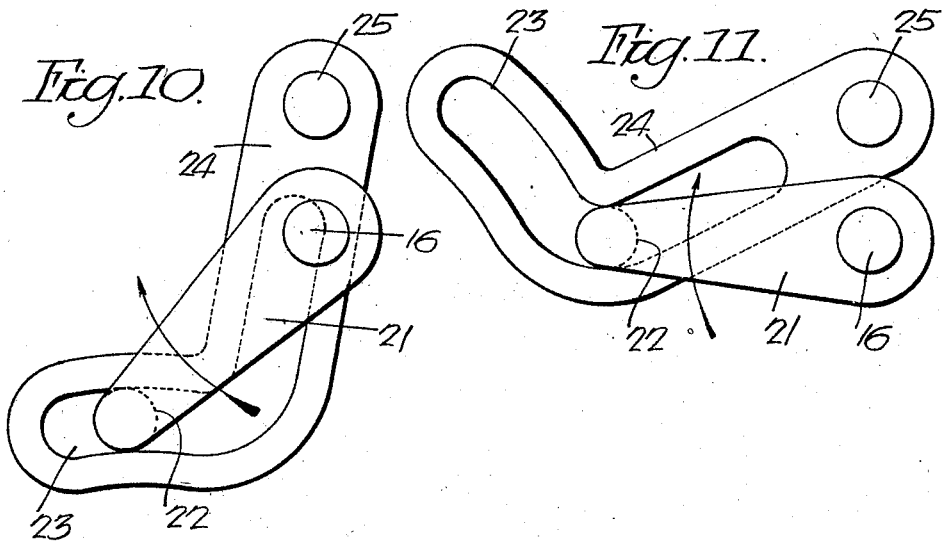
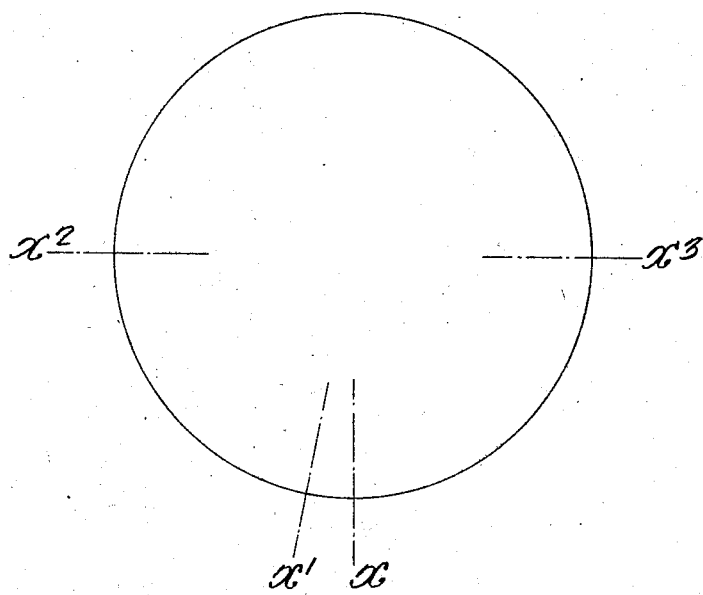
Inventor:
Rudolf Loeb.
by his Attorneys Patented May 26, 1925.

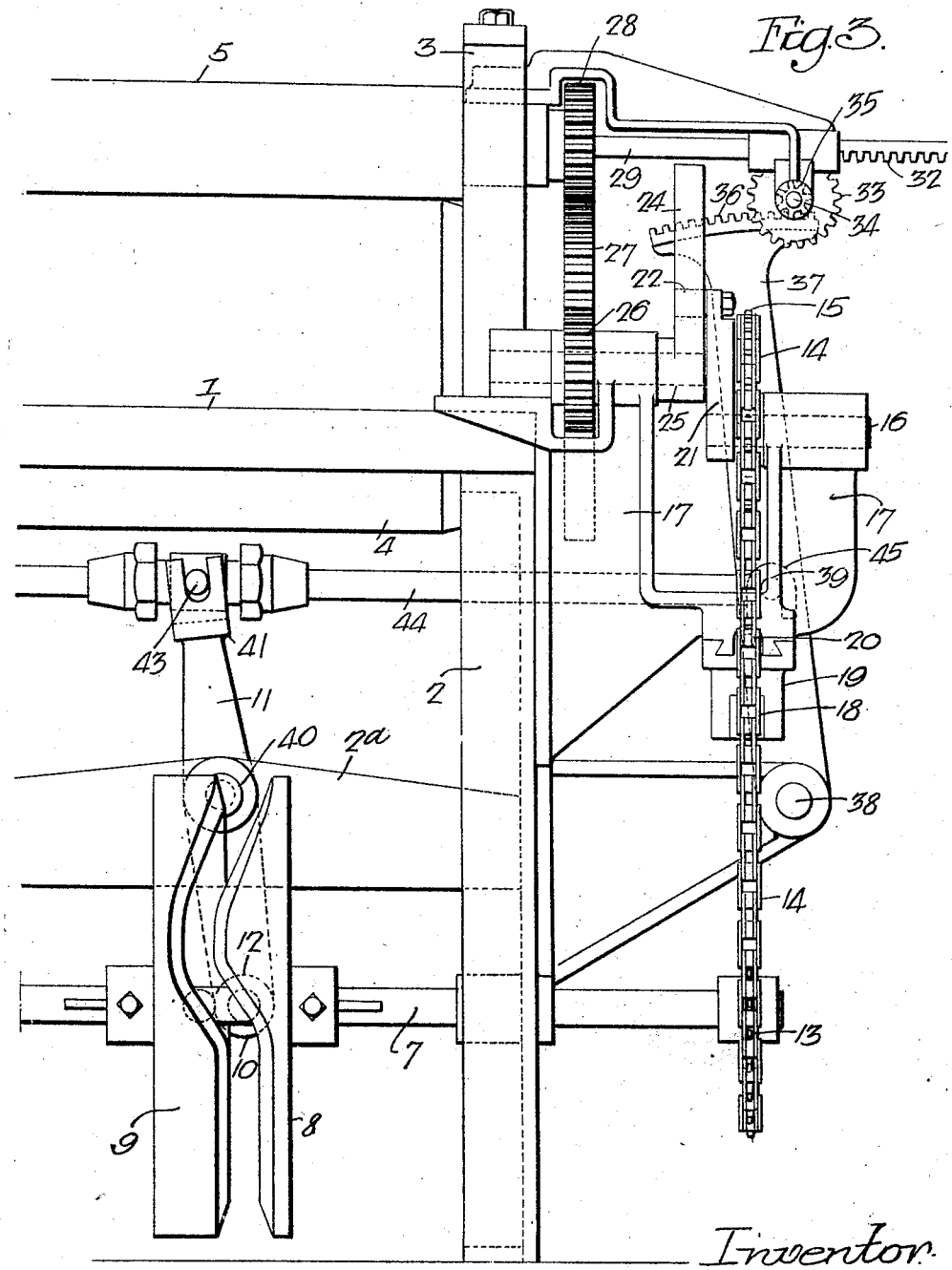

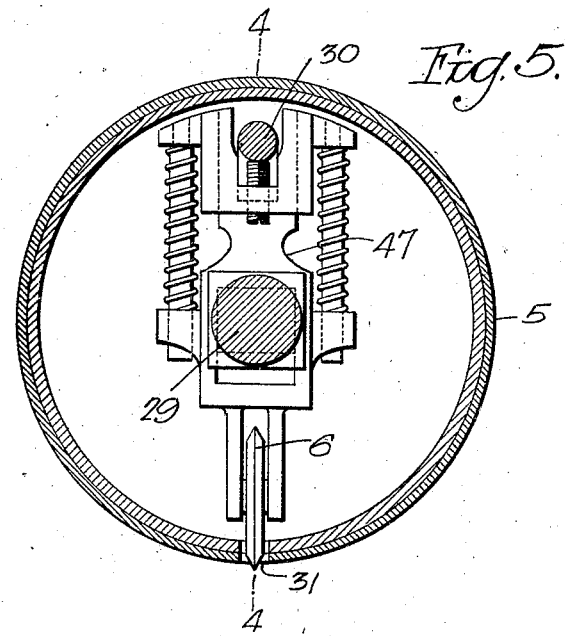
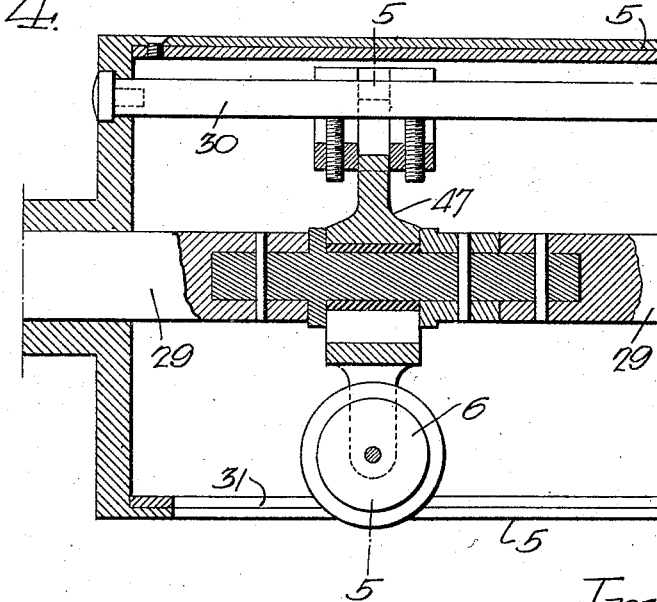

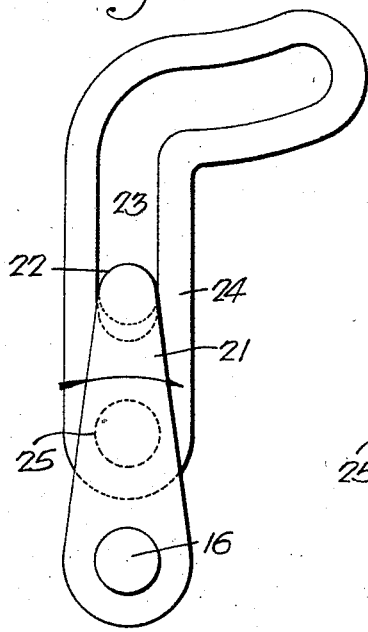
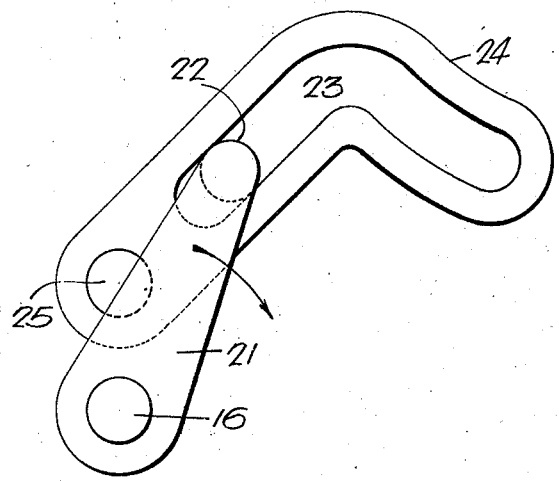
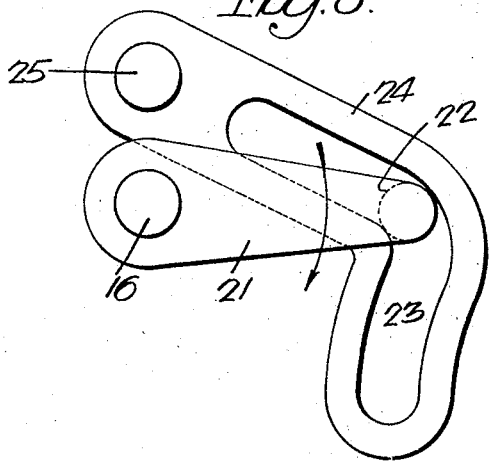
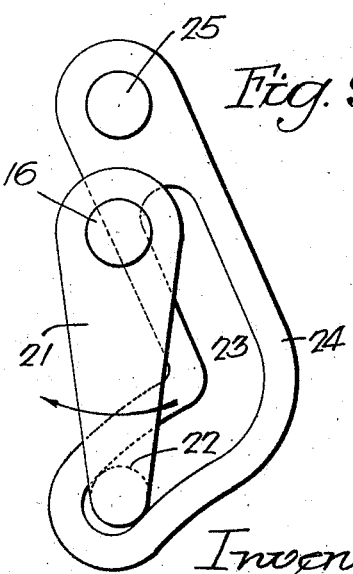

1,539,123

UNITED STATES PATENT OFFICE.

RUDOLF LOEB, OF JENKINTOWN, PENNSYLVANIA, ASSIGNOR TO LOEB & WASCH COMPANY, INC., OF CAMDEN, NEW JERSEY, A CORPORATION OF NEW JERSEY.

MEANS FOR CUTTING FABRICS.

Application filed January 28, 1921. Serial No. 440,717.

*To all whom it may concern:*

Be it known that I, RUDOLF LOEB, a citizen of the United States, residing in Jenkintown, Montgomery County, Pennsylvania, have invented certain Improvements in Means for Cutting Fabrics, of which the following is a specification.

My invention relates to certain improvements in a machine for cutting fabrics into given lengths from a piece, or roll, for which Letters Patent were applied for by me on the first day of September, 1920, Serial No. 407,453.

The object of my present invention is to provide mechanism for imparting to the feed rolls, one of which carries a cutter, a variable movement so that, when the cutter is in action to sever the piece of goods, the rolls are traveling at a comparatively slow speed, and when the cutter is out of action the speed is increased until the cutter again nears the cutting point.

In the accompanying drawings:

Fig. 3 is a rear view of a portion of the machine;

Fig. 4 is a longitudinal sectional view of one of the rolls illustrating the cutter, the section being on the line 4—4, Fig. 5.

Fig. 5 is a sectional view on the line 5—5, Fig. 4;

Figure 1:
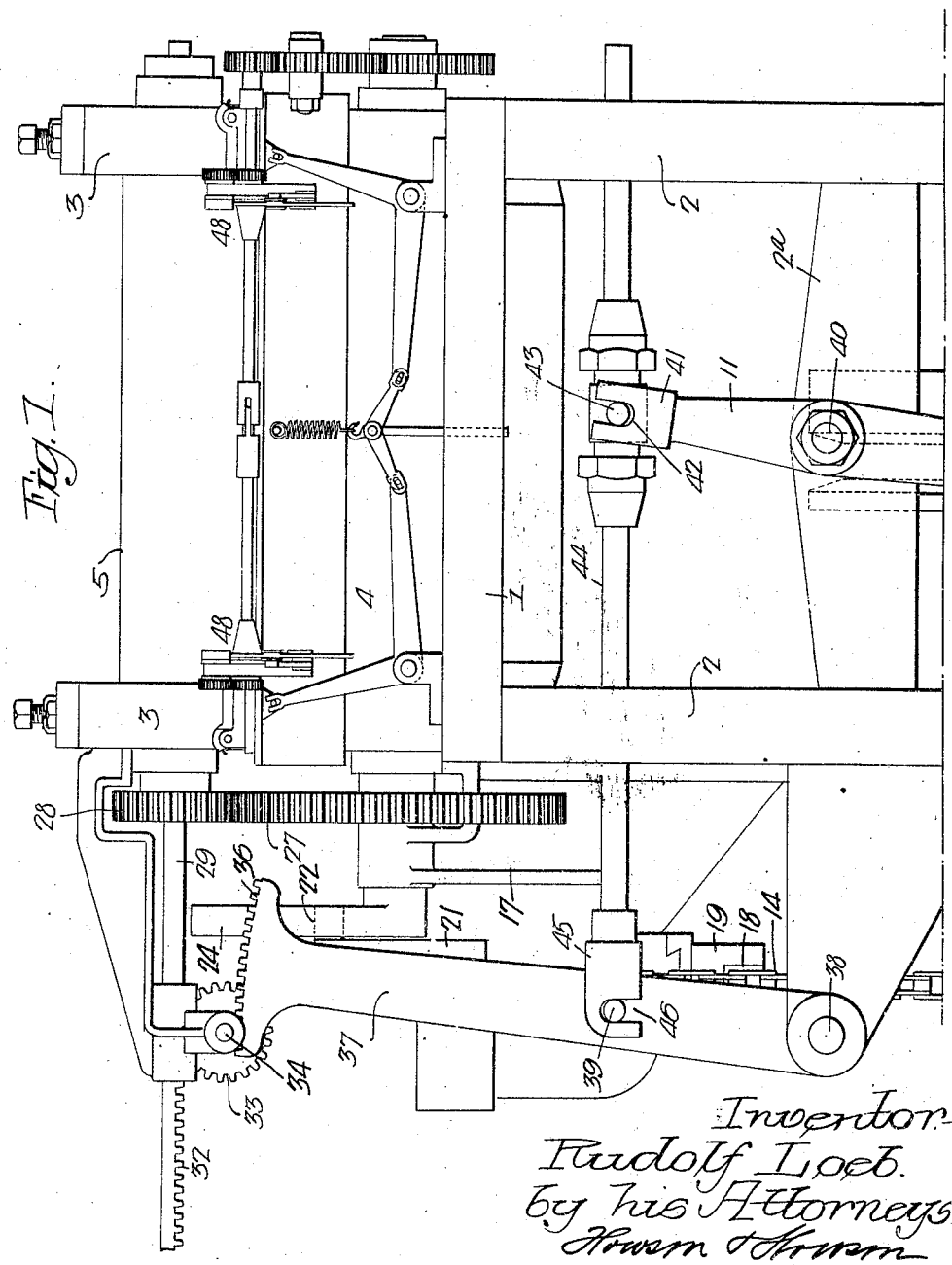
Fig. 1 is a front elevation illustrating my improved machine for cutting fabrics.
Figure 2:
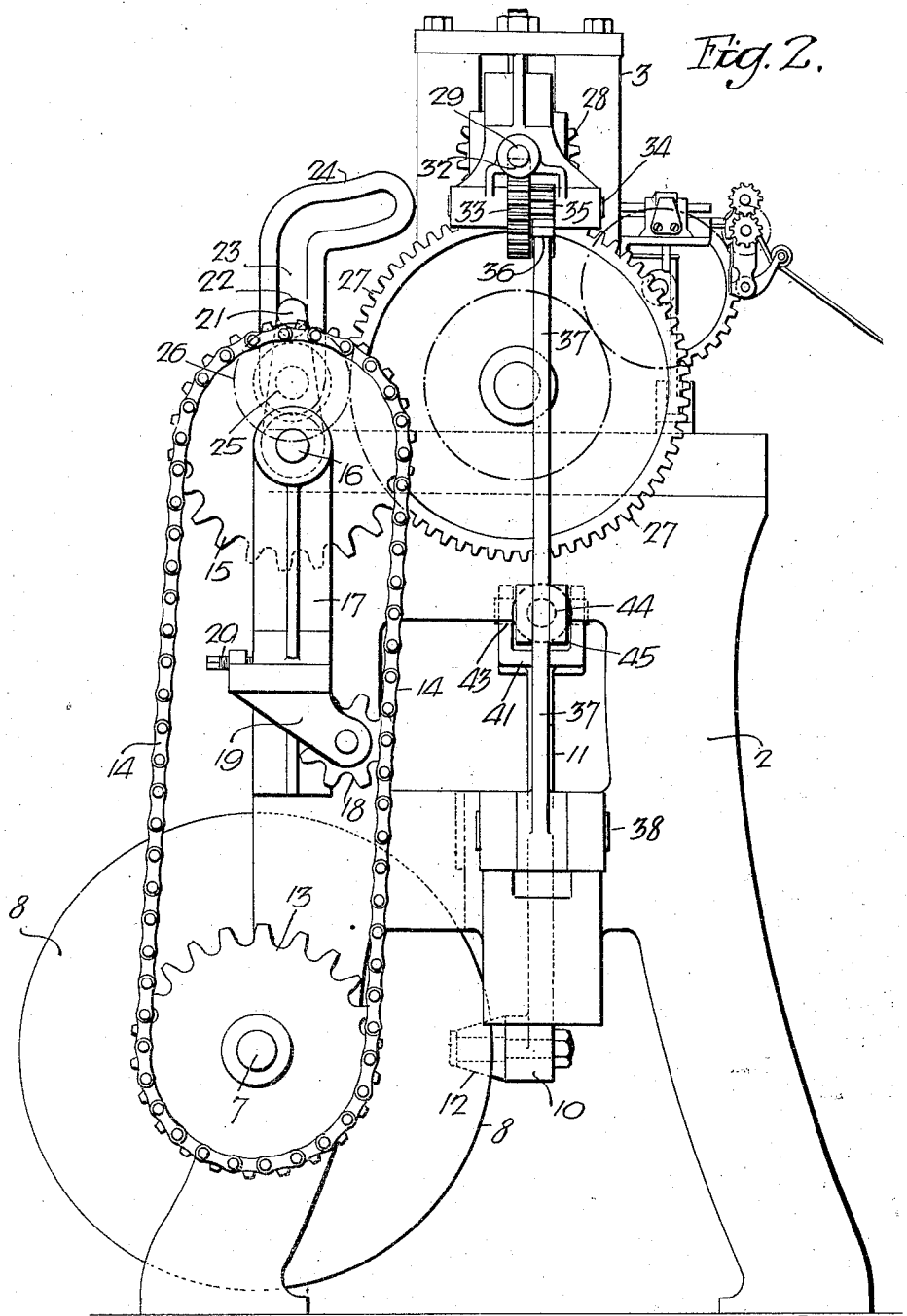
Fig. 2 is an end view.

Figs. 6 to 11, inclusive, are diagrammatic views, showing the cam arm in different positions, and Fig. 12 is a diagrammatic view indicating the movement of the feed roll carrying the cutter.

Referring to the drawings, 1 is the base of the machine mounted on legs 2. On this base are housings 3 for the feed rolls 4 and 5. The roll 5 carries the cutter 6, shown clearly in Figs. 4 and 5. The details of this cutter will be described hereinafter.

7 is the main driving shaft of the machine mounted in suitable bearings on the legs 2. On this driving shaft are two cam disks 8 and 9, Fig. 3, preferably having beveled surfaces, as shown, and mounted on an arm 10 of a lever 11 is a conical roller 12, which is adapted to the recess formed by the two cam disks. By making the bearing surface of the cam disks beveled and using a conical roller, the disks can be readily taken up for wear.

Mounted on the shaft 7 is a sprocket wheel 13 around which passes a chain 14 to a sprocket wheel 15 on a shaft 16 having its bearings in a bracket 17 projecting from the outside portion of the machine.

18 is a take up roller mounted on an adjustable bearing 19 on the under side of the bracket 17 and provided with a screw 20, or other means, for adjusting it to take up the slack. On the shaft 16 is an arm 21 having a pin 22 adapted to a slide 23 in a cam 24 mounted on a shaft 25 having its bearings in the bracket 17. Secured to the shaft is a pinion 26, which meshes with a gear wheel 27 on the lower feed roll 4. This gear wheel, in turn, meshes with a gear wheel 28 on the upper feed roll 5. In the present instance, the upper roll 5 is considerably less in diameter than the lower feed roll.

The cutter 6 is attached to a rod 29, which projects through the ends of the roll 5 and is guided by a rod 30 located within the roll. The cutter projects through a longitudinal slot 31 in the roll. This construction is fully described in the application hereinbefore referred to.

The cam arm 24 is so shaped that when the knife is traveling from the point $x$ to the point $x'$, Fig. 12, it is rotating slowly, and the cutter is moving longitudinally of the roll to make the cut. From the point $x'$ to the point $x^2$ the movement of the roll is increased, and from the point $x^2$ to the point $x^3$, its movement is rapid. From the point $x^3$ to the point $x$, it decreases in speed.

Referring to the diagrams, Fig. 6 shows the two arms 21 and 24 in the mid position and moving rapidly in the direction of the arrow.

Fig. 7 shows the parts of the arm still moving rapidly and the pin 22 gradually moving forward in the slot 23, and when it reaches the position shown in Fig. 8 the movement is slackened, and from the position shown in Fig. 8 to that illustrated in Fig. 9, the speed gradually decreases. From the position shown in Fig. 9 to that shown in Fig. 10, there is very little movement of the roll. While the roll is moving from the position shown in Fig. 9, which is $x$, Fig.

12, to the position shown in Fig. 10, which is $x'$, the cutter moves longitudinally of the rolls and cuts the fabric. While the arm 21 is moving from the position shown in Fig. 10 to that shown in Fig. 11, the speed of the roll is gradually increasing.

In the present instance, the bar 29, to which the cutter is attached, has rack teeth 32, which mesh with the teeth of a pinion 33 on a shaft 34 on which is a pinion 35, the teeth of which mesh with a rack 36 on an arm 37 pivoted at 38 to a bracket projecting from the fixed portion of the machine. On the lever 11, which is pivoted at 40 to a cross frame $2^a$, is a forked end 41, slotted at 42 to receive a pin 43 adjustably mounted on a rod 44 having at one end a forked head 45 recessed at 46 to extend over a pin 39 on the arm 37. By this arrangement, the disks 8 and 9, which form the cam, actuate the carrier 47 on which the cutting disk is mounted.

The fabric to be cut is preferably wound in a roll, which is located in front of the machine, and is guided by mechanism 48 to the rolls. This mechanism is fully described in the application hereinbefore alluded to and forms no part of the present invention.

The rolls 4 and 5 are the feed rolls of the machine so that the material travels continuously through the machine, but the speed varies, due to the arrangement of the arm 21 and the cam arm 24. The mechanism for reciprocating the cutter is timed with the feed mechanism so that while the rolls are feeding the material slowly, the cutter passes over the fabric and makes the cut. During the remainder of the revolution of the rolls, the cutter is returned to its first position.

I claim:

1. The combination in a machine for cutting fabrics and like material, of two feed rolls; a reciprocating cutter mounted in one of said rolls; means for operating the cutter; means for imparting a variable movement to the feed rolls; and means for coordinating the cutter operating and feed roll operating means so that the cutter will cut the material during the time it is being fed slowly through the machine.

2. The combination in a machine for cutting fabrics, and like materials, of two feed rolls; a reciprocating cutter mounted in one of said rolls; means for imparting movement to the cutter; an operating arm; means for driving said arm; a cam arm having a cam slot therein, the operating arm having a pin adapted to the slot; a shaft on which the cam is mounted; and mechanism for driving the feed rolls from the shaft of the cam arm.

3. The combination in a machine for cutting fabrics, and like materials, of two feed rolls; a reciprocating cutter mounted in one of said feed rolls; means for reciprocating the cutter; a driving arm having a pin; means for driving the arm; and a cam arm having a slot into which the pin extends, said slot having an angular extension and so proportioned that during a certain portion of the revolution the pin of the operating arm will travel in the angular slot of the cam arm and thus reduce the speed of rotation of the feed rolls, the mechanism for operating the cutter being in timed relation with the mechanism for operating the rolls so that the cut will be made during the time the speed of the rolls is reduced.

4. The combination in a machine for cutting fabrics, and like materials, of a frame; two feed rolls mounted on the frame; a driving shaft; a sprocket wheel on the driving shaft; an intermediate shaft having a sprocket wheel thereon; a chain passing around the two sprocket wheels; a shaft on which the last mentioned sprocket wheel is mounted; an arm on said shaft; a pin on the arm; a cam arm having an angular slot into which the pin extends; a shaft on which the cam arm is mounted; gearing between said shaft and the rolls through which they are driven; a reciprocating cutter mounted in one of the rolls; and means, driven from the main shaft, for moving the cutter, the means being so timed that the cut will be made while the rolls are moving slowly.

5. The combination in a machine for cutting fabrics, and like materials, of two feed rolls; a reciprocating cutter mounted in one of said rolls; a main shaft; a cam thereon consisting of two disks spaced apart; a lever pivoted to the frame of the machine and having a roller extending into the space between the disks; a pivoted arm having a toothed segment at its upper end; a rod coupled to the arm and to the lever; a shaft having a pinion meshing with the toothed segment; a second pinion on the shaft; a rod attached to the cutter and extending through one end of the rolls and having teeth meshing with the teeth of the pinion; and means for driving said feed rolls.

6. The combination in a machine for cutting fabrics, and like materials, of two feed rolls; a cutter mounted in one of said rolls and extending through a slot therein; a rod attached to the cutter and having rack teeth; a pinion meshing with said teeth; a shaft on which the pinion is mounted; a second pinion on said shaft; a pivoted arm having a toothed segment meshing with the teeth of the second rack; a main shaft; a cam thereon; a lever actuated by the cam; a rod connecting the lever with the cam having the segment; and means for driving the feed rolls.

7. The combination in a machine for cutting fabrics, and like materials, of two feed rolls, one of said rolls being slotted; a cutter mounted in said slotted roll and extending through the slot therein; a main shaft; two cam disks on said shaft, each of said disks having beveled surfaces, one disk being spaced from the other to form a cam slot; a lever having a tapered roller extending into the cam slot; means connecting the lever with the cutter so as to reciprocate the cutter; and means for driving the rolls.

RUDOLF LOEB.